(12) United States Patent
McPheeters (10) Patent No.: US 11,038,458 B2
(45) Date of Patent: Jun. 15, 2021

(54) SKIRT MOUNT ATTACHABLE TO A SOLAR PANEL MODULE FRAME

(71) Applicant: Sunrun South LLC, San Luis Obispo, CA (US)

(72) Inventor: Greg McPheeters, Santa Cruz, CA (US)

(73) Assignee: Sunrun South LLC, San Luis Obispo, CA (US)

( * ) Notice: Subject to any disclaimer, the term of this patent is extended or adjusted under 35 U.S.C. 154(b) by 0 days.

(21) Appl. No.: 16/455,058

(22) Filed: Jun. 27, 2019

(65) Prior Publication Data

US 2020/0099331 A1    Mar. 26, 2020

Related U.S. Application Data

(63) Continuation of application No. 15/648,168, filed on Jul. 12, 2017, now Pat. No. 10,381,974.

(60) Provisional application No. 62/361,395, filed on Jul. 12, 2016.

(51) Int. Cl.
| | |
|---|---|
| *H01L 31/042* | (2014.01) |
| *H02N 6/00* | (2006.01) |
| *H02S 30/10* | (2014.01) |
| *H02S 30/00* | (2014.01) |
| *F24S 25/636* | (2018.01) |
| *F24S 25/632* | (2018.01) |

(52) U.S. Cl.
CPC ............ *H02S 30/10* (2014.12); *F24S 25/632* (2018.05); *F24S 25/636* (2018.05); *H02S 30/00* (2013.01)

(58) Field of Classification Search
CPC ...... F24S 25/632; F24S 25/634; F24S 25/636; H02S 30/10
See application file for complete search history.

(56) References Cited

U.S. PATENT DOCUMENTS

| | | | | |
|---|---|---|---|---|
| 2013/0340358 | A1* | 12/2013 | Canning | B23P 11/00 52/126.7 |
| 2014/0053891 | A1* | 2/2014 | West | H02S 20/00 136/251 |
| 2016/0268958 | A1* | 9/2016 | Wildes | H02S 20/23 |
| 2017/0155356 | A1* | 6/2017 | Schuit | H02S 20/23 |

* cited by examiner

*Primary Examiner* — Angelo Trivisonno
(74) *Attorney, Agent, or Firm* — Kramer Levin Naftalis & Frankel LLP (57) ABSTRACT

A system, apparatus, and method of mounting a solar panel module skirt to a solar panel module frame are disclosed. The system could include a number of solar panel modules, a number of skirt mount assemblies, and a solar panel module skirt. The apparatus could include a first structure, a second structure, and a fastener. The method could include receiving the apparatus, placing the apparatus into a tightening position, and tightening the fastener to mount the apparatus to the frame.

20 Claims, 13 Drawing Sheets

SKIRT MOUNT ATTACHABLE TO A SOLAR PANEL MODULE FRAME

BACKGROUND OF THE DISCLOSURE

Solar panel installations typically require framed solar panels, or modules with frames within which the solar panels are attached, mounted on complex base structures assembled from posts, rails, clamps, and other fasteners. These base structures are often remain visible after installation and are aesthetically unpleasing. These base structures are also exposed to wind resulting in wind forces being applied to the underside of the panel or an array of panels. Accordingly, it would be desirable to mask edges of solar panel modules around the perimeter of the module or array.

SUMMARY OF THE DISCLOSURE

The solar panel installation systems disclosed herein may include a skirt mount apparatus or assembly mounted to a solar module frame of a solar module or an array of solar modules suspended above the installation surface, where skirt could be mounted using a number of these skirt mount assemblies.

In one aspect, embodiments of the inventive concepts disclosed herein are directed to a solar panel system. The system could include a number of solar panel modules, a number of skirt mount assemblies, and a solar panel module skirt.

In a further aspect, embodiments of the inventive concepts disclosed herein are directed to a solar panel module skirt mounting apparatus having a first structure, a second structure, and a fastener. The first structure could include a main body, an curved upper arm which a tipped end, a lower arm with a tipped end, and upper and lower flanges substantially parallel to each other. The second structure could include a main body, and upper and lower flanges substantially parallel to each.

In a further aspect, embodiments of the inventive concepts disclosed herein are directed to a method for mounting the skirt mounting apparatus to a solar panel module frame. When properly performed, the apparatus could be received; the upper flange of the second structure and the upper flange of the first structure could be placed into a tightening position, respectively; and the fastener could be tightened to clamp the apparatus to solar panel module frame.

BRIEF DESCRIPTION OF THE DRAWINGS

For a fuller understanding of the inventive embodiments, reference is made to the following description taken in connection with the accompanying drawings in which.

DETAILED DESCRIPTION OF THE PREFERRED EMBODIMENTS

Figure 1:
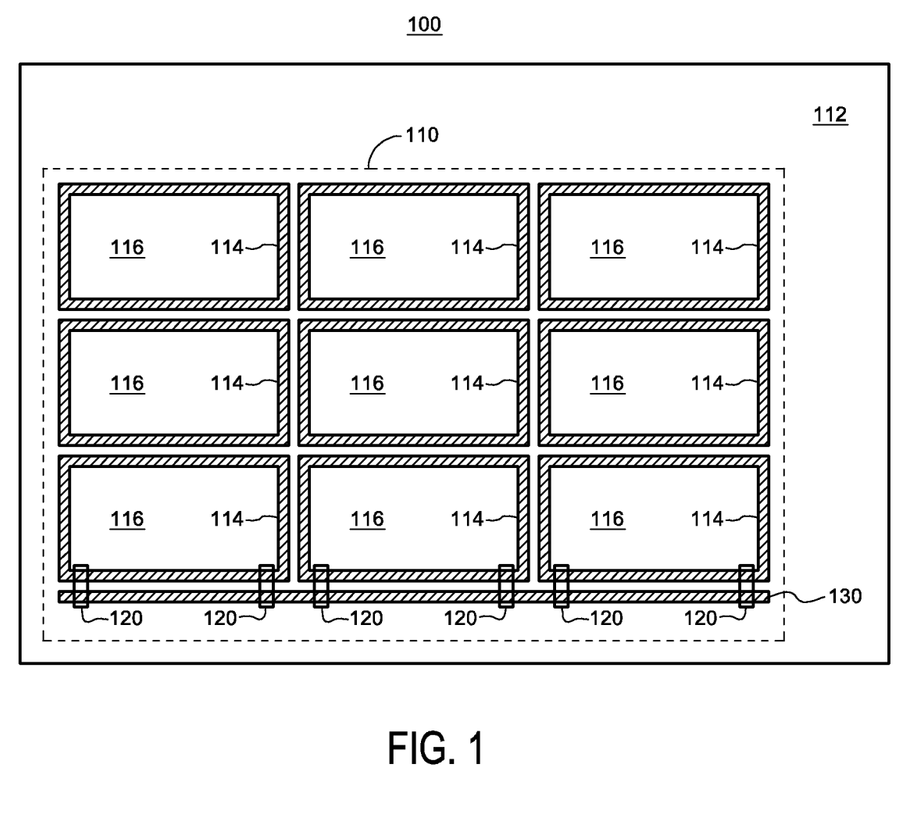
FIG. 1 shows a schematic top plan view of solar panel installation system, in accordance with various embodiments.

FIG. 1 shows a schematic top plan view of solar panel installation system 100, in accordance with various embodiments. Installation system 100 may include an array of solar modules 110 mounted to and above an installation surface 112 with supporting structures. Each solar module 110 includes module frame 114 that supports panel 116, which includes an array of electricity-generating solar cells covered with a protectant material such as, for example, tempered glass or a laminate material. Solar modules 110 are typically rectangular-shaped structures having four corners, but other shapes are possible and explicitly contemplated for use with the embodiments disclosed herein.

Skirt mounting assembly 120 may be coupled to an edge of module frame 114 to facilitate an installation of skirt 130 that, when employed, may block the wind from blowing in between the array of solar modules 110 and the installation surface 112 while blocking the view of the supporting structures from observers.

A suitable number of skirt mounting assemblies 120 can be employed along the perimeter of the array of solar modules 110 by providing them along the outer edges of one or more module frames 114 forming the perimeter of the array. In some embodiments, skirt mounting assemblies 120 may be provided along long outer edges of the module frames 114 as shown in FIG. 1. In some embodiments, skirt mounting assemblies 120 may be provided along short outer edges of the module frames 114. In some embodiments, skirt mounting assemblies 120 may be provided along both long and short outer edges of the module frames 114.

Figure 2:
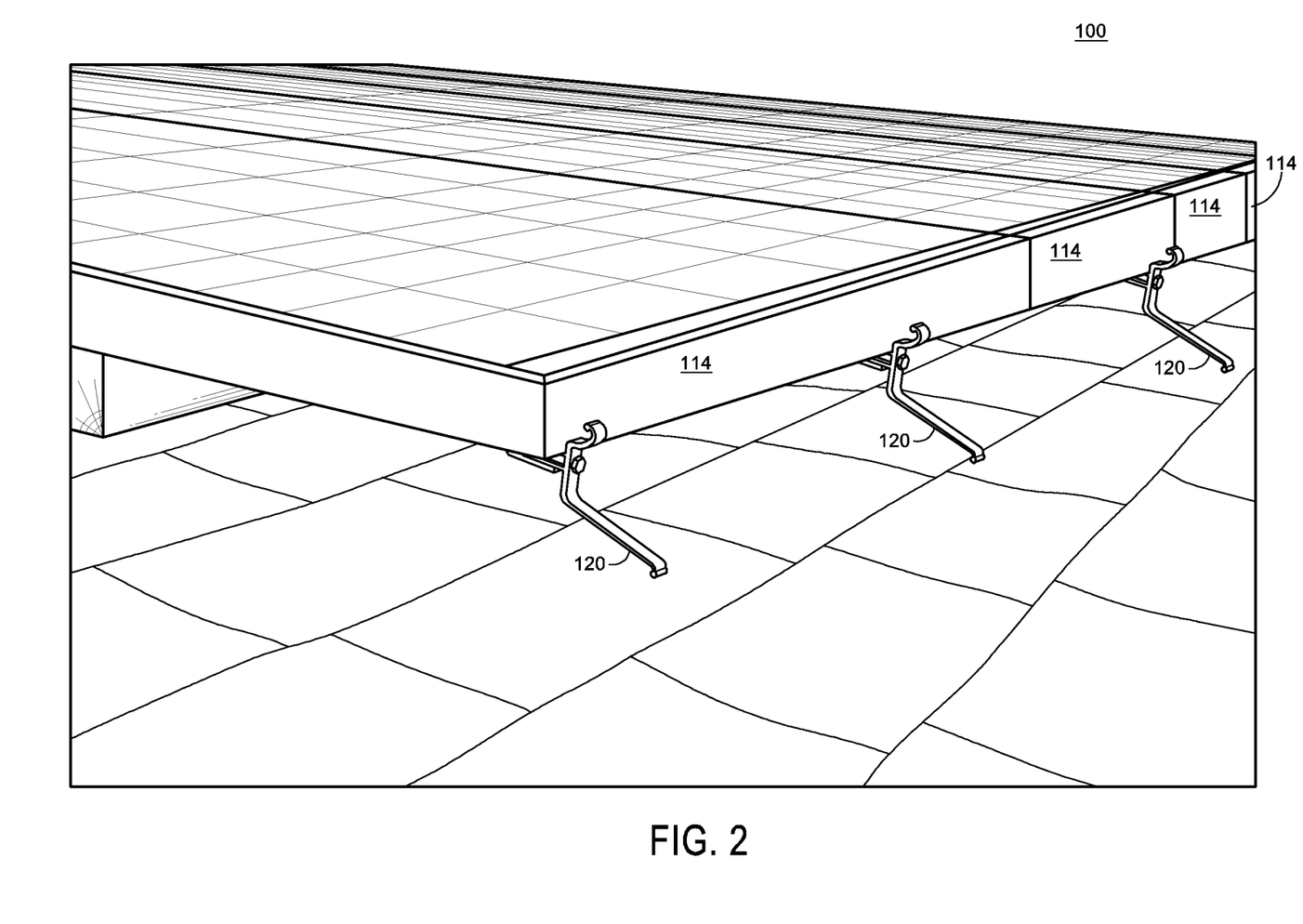
FIG. 2 shows a perspective view of the solar panel installation system, in accordance with various embodiments.

FIG. 2 shows a perspective view of installation system 100, including skirt mounting assemblies 120 coupled to module frames 114 of solar modules 110, in accordance with various embodiments. Each skirt mount assembly 120 is configured to be clamped to the bottom of the module frame 114. Advantageously, installation system 100 does not require any holes to be made in the module frame 114.

Figure 3:
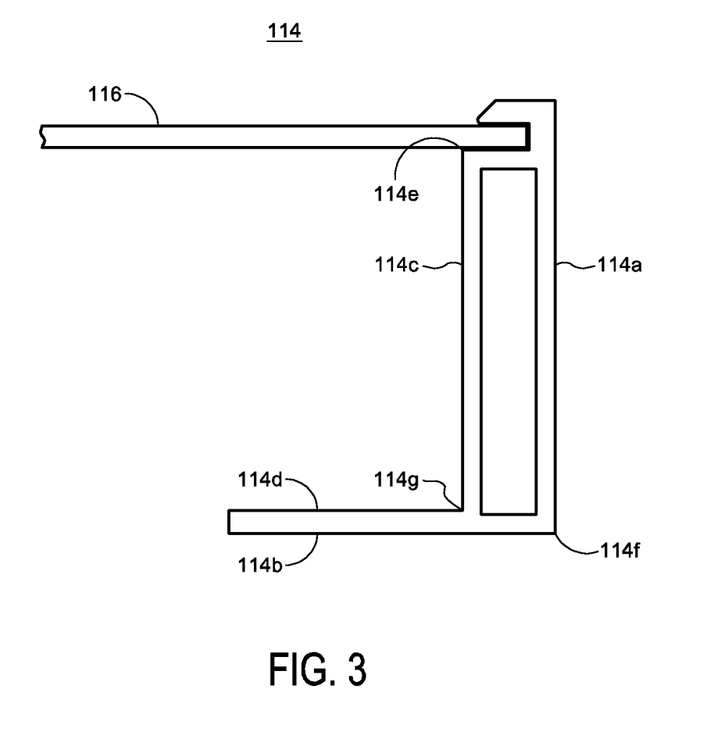
FIG. 3 shows a side view of a module frame, in accordance with various embodiments.

FIG. 3 shows a side view of solar module 110, in accordance with various embodiments. Solar module 110 includes outer vertical surface 114a, inner vertical surface 114c, lower horizontal surface 114b upper horizontal surface 114d, and slot 114e to secure panel 116 within module frame 114. Vertical surfaces 114a and 114c may be substantially parallel to each other and substantially perpendicular to the horizontal surfaces 114b and 114d. As shown, outer corner 114f may be formed by the intersection of the outer vertical surface 114a with the outer horizontal surface 114b, and an inner corner 114g may be formed by the intersection of the inner vertical surface 114c and the inner horizontal surface 114d.

Figure 4:
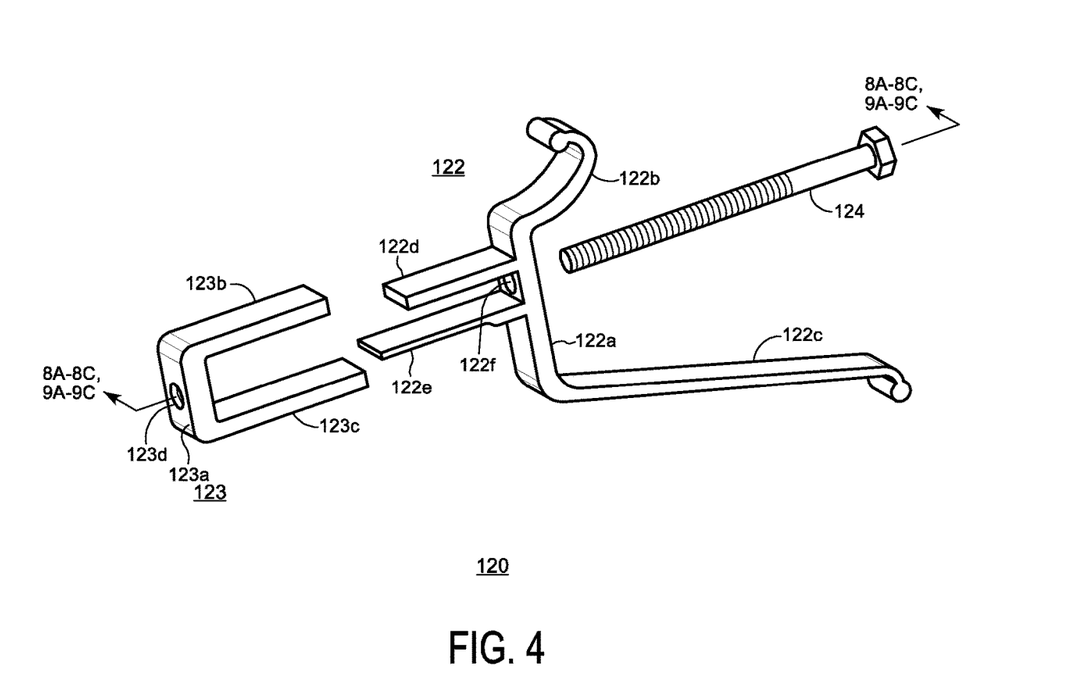
FIG. 4 shows an exploded view of a skirt mount assembly, in accordance with various embodiments.

FIG. 4 shows an exploded view of skirt mount assembly 120, in accordance with various embodiments. Skirt mount assembly 120 is designed to clamp onto the edge of a module frame and support a module skirt. Skirt mount assembly 120 includes skirt mount 122, U-shaped member 123, and fastener 124. Skirt mount 122 includes main body 122a and upper arm 122b and lower arm 122c, each arm extending obliquely away from a first side of main body 122a. Skirt mount 122 also includes guide members 122d and 122e extending substantially perpendicularly from a second side of main body 122a. Aperture 122f is arranged in between guide members 122d and 122e for receiving fastener 124.

U-shaped member 123 includes web 123a, guided members 123b and 123c extending substantially perpendicularly away from web 123a. Aperture 123d extends through web 123a to receive fastener 124, which couples u-shaped member 123 to skirt mount 122. Guided members are shaped and spaced to interact with guide members 122d and 122e of skirt mount 122 in order to prevent rotation of u-shaped member 123 with respect to skirt mount. Although FIG. 4 depicts guide members 122d and 122e being configured to fit in between guided members 123b and 123c, in other embodiments, guided members 123b and 123c could be configured to fit in between guide members 122d and 122e.

Figure 5:
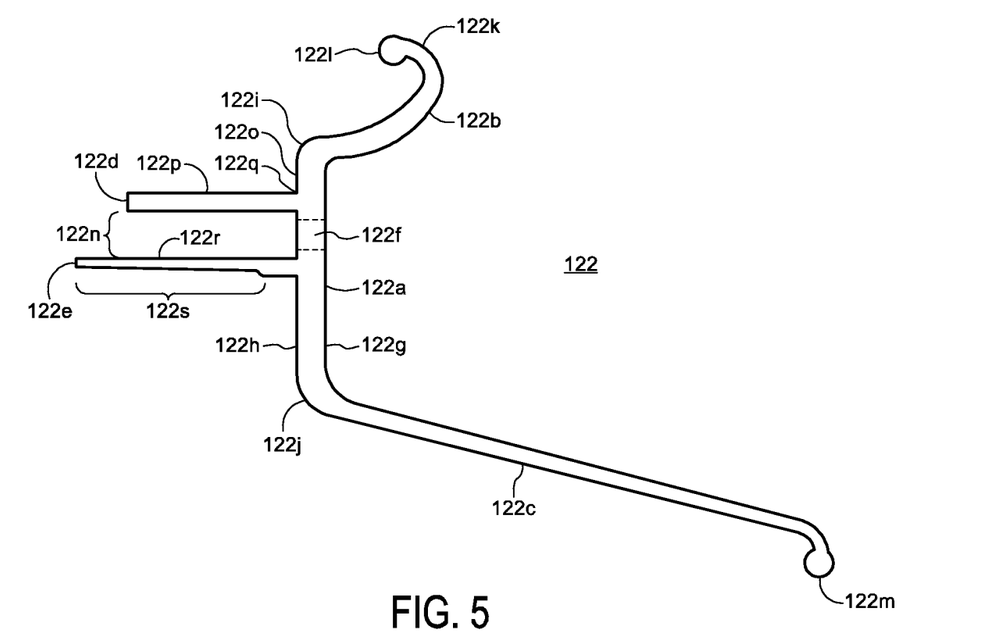
FIG. 5 shows a side view of a skirt mount of the skirt mount assembly, in accordance with various embodiments.
Figure 9A:
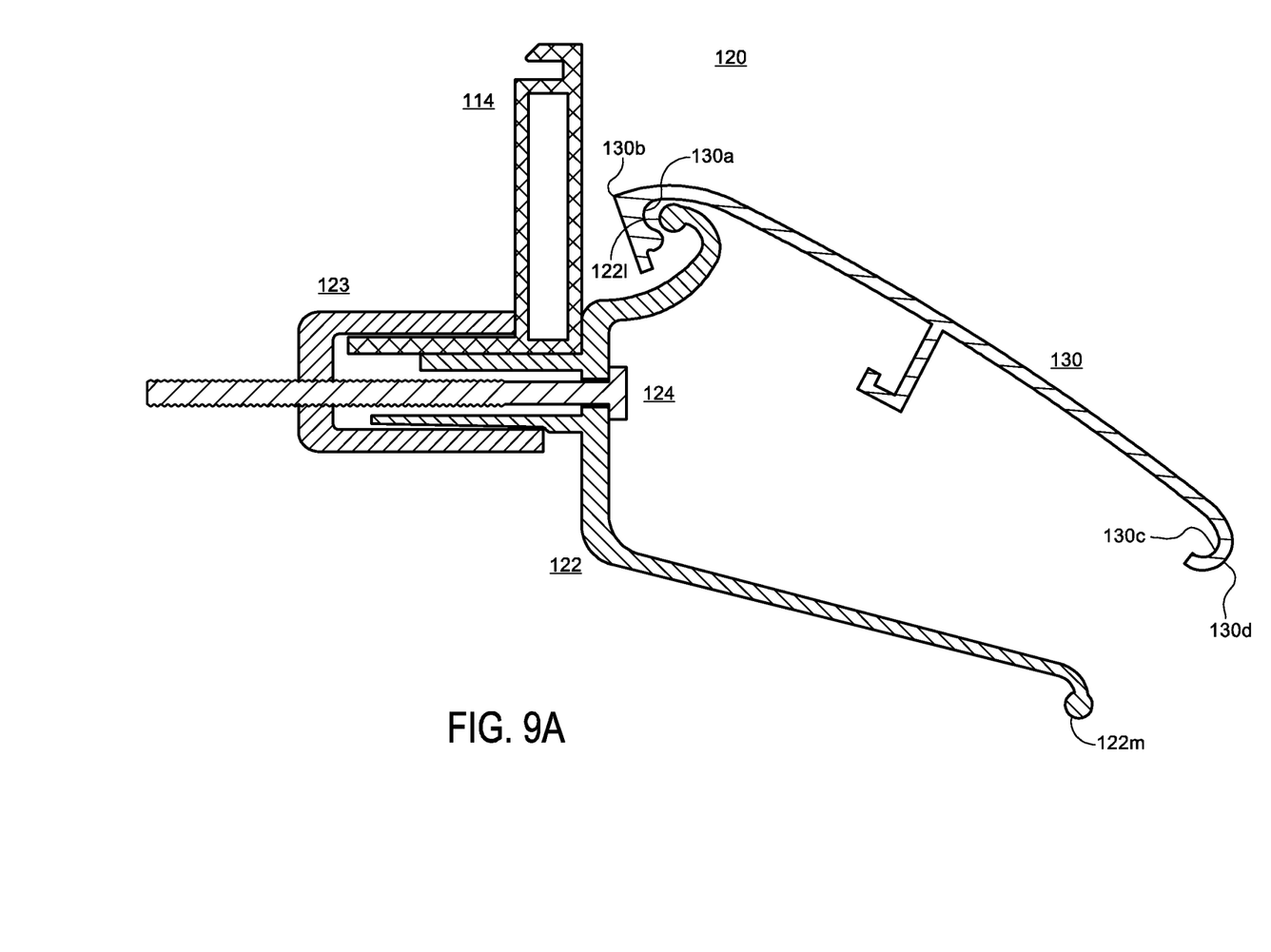
FIGS. 9A-9C show cross-sectional views of a skirt being attached on the skirt mount, in accordance with various embodiments.

FIG. 5 shows a side view of the skirt mount 122. Main body 122a includes outer surface 122g, inner surface 122h, upper end 122i, which serves as a base for upper arm 122b, and lower end 122j, which serves as a base for the lower arm 122c. Upper arm 122b extends away from its base, curving upwardly to form hook 122k configured with a tipped end 122l to facilitate an engagement with an upper inner surface 130a of a curved upper edge 130b of the skirt 130 (e.g. as shown in FIG. 9A) while it is being installed. Lower arm 122c extends away from its base in a generally downward direction until reaching a tipped end 122m to facilitate an engagement with a lower inner surface 130c of a curved lower edge 130d of the skirt 130 (shown in FIG. 9A) when the skirt placed on the skirt mount 122 while it is being installed.

Guide members 122d and 122e extend away from the inner surface 122h of main body 122a in a substantially perpendicular direction.

Guide members 122d and 122e are substantially parallel to each other and form gap 122n. When skirt mounting assembly 120 is clamped to module frame 114, fastener 124 extends through both the aperture 122f and the gap 122n.

Inner surface 122h can include vertical clamping surface 122o, arranged in between upper end 122i and upper surface 122p of upper flange 122d. As skirt mounting assembly 120 is being clamped to the module frame 114, vertical clamping surface 122o and horizontal positioning surface 122p of the upper flange 122d may be placed into engagement against portions of outer vertical surface 114a and outer horizontal surface 114b of module frame 114, respectively, so that inner corner 122q, formed by the intersection of vertical clamping surface 122o and horizontal positioning surface 122p, can engage outer corner 114f of module frame 114.

Lower flange 122e includes positioning surface 122r. As skirt mounting assembly 120 is clamped to the module frame 114, positioning surface 122r engages positioning surface 123k (e.g. as shown in FIG. 6) to facilitate placement of guide members 122d and 122e within gap 123g of u-shaped member 123 and alignment of the fastener 124 with the aperture 123d.

In some embodiments, one or both of guide members 122d and 122e can be tapered. As depicted in FIG. 5, guide member 122d includes tapered portion 122s, resulting in gradual narrowing of the thickness of guide member as it extends away from inner surface 122h. As skirt mounting assembly 120 is being clamped to module frame 114, the presence of tapered portion 122s can serve to ease the placement of guide members 122d and 122e into the gap 123g.

Figure 6:
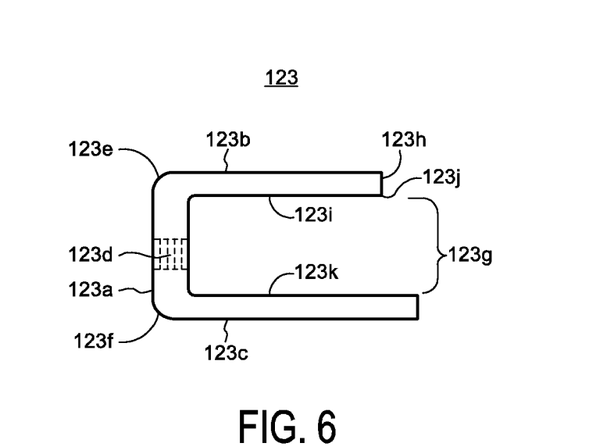
FIG. 6 shows a side view of a U-shaped member of the skirt mount assembly, in accordance with various embodiments.

FIG. 6 shows a side view of U-shaped member 123. Web 123a includes upper end 123e, serving as a base of guided member 123b, and lower end 123f serving as a base of the guided 123c. Guided members 123b and 123c extend away from the web 123a in a substantially perpendicular direction and are substantially parallel to each other, forming gap 123g. When the skirt mounting assembly 120 is clamped to module frame 114, guide members 122d and 122e are arranged in gap 123g, and fastener 124 extends into aperture 123d. In some embodiments, aperture 123d may be threaded to engage a threaded end of fastener 124. Although not shown in FIG. 4, the fastener 124 may engage complementary fastening hardware (e.g., a threaded nut, washer, etc.) in some embodiments.

Guided member 123b includes stop surface 123h at the distal end (relative to web 123a) and positioning surface 123i. As skirt mounting assembly 120 is clamped to the module frame 114, the stop surface 123h and the positioning surface 123i may become engaged with inner vertical 114c surface and inner horizontal surface 114d of module frame 114, respectively, so that outer corner 123j formed by the intersection of stop surface 123h and positioning surface 123i engages inner corner 114g of module frame 114.

Guided member 123c includes the positioning surface 123k. As skirt mounting assembly 120 is clamped to module frame 114, positioning surface 123k may engage the positioning surface 122r as stated above to facilitate the placement of the upper and lower flanges 122d and 122e into the gap 123g and the alignment of the fastener 124 with the aperture 123d.

Figure 7:
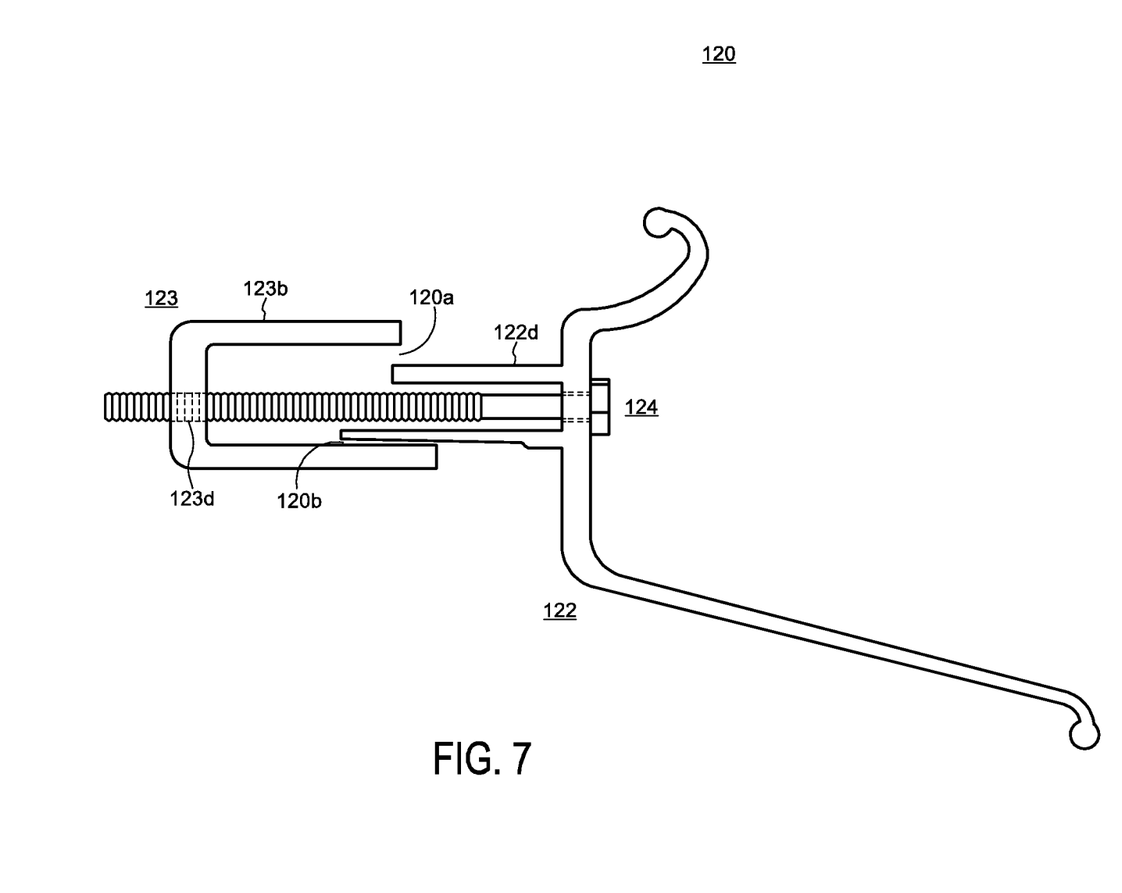
FIG. 7 shows a side view of the skirt mount assembly, in accordance with various embodiments.

FIG. 7 shows a side view of skirt mount assembly 120, in accordance with some embodiments. In particular, FIG. 7 depicts skirt mount 122 coupled to U-shaped member 123 with fastener 124 threadably engaged with the aperture 123d. As shown, gap 120a may be formed in between the guide members 122d and 122e to facilitate their placement above the upper horizontal surface 114d and lower horizontal surface 114b of the horizontal member of the module frame 114 as the skirt mounting assembly 120 is being clamped to module frame 114. In embodiments in which guide member 122e includes tapered portion 122s, gap 120b will form between guide member 122 and guided member 123c.

Figure 8A:
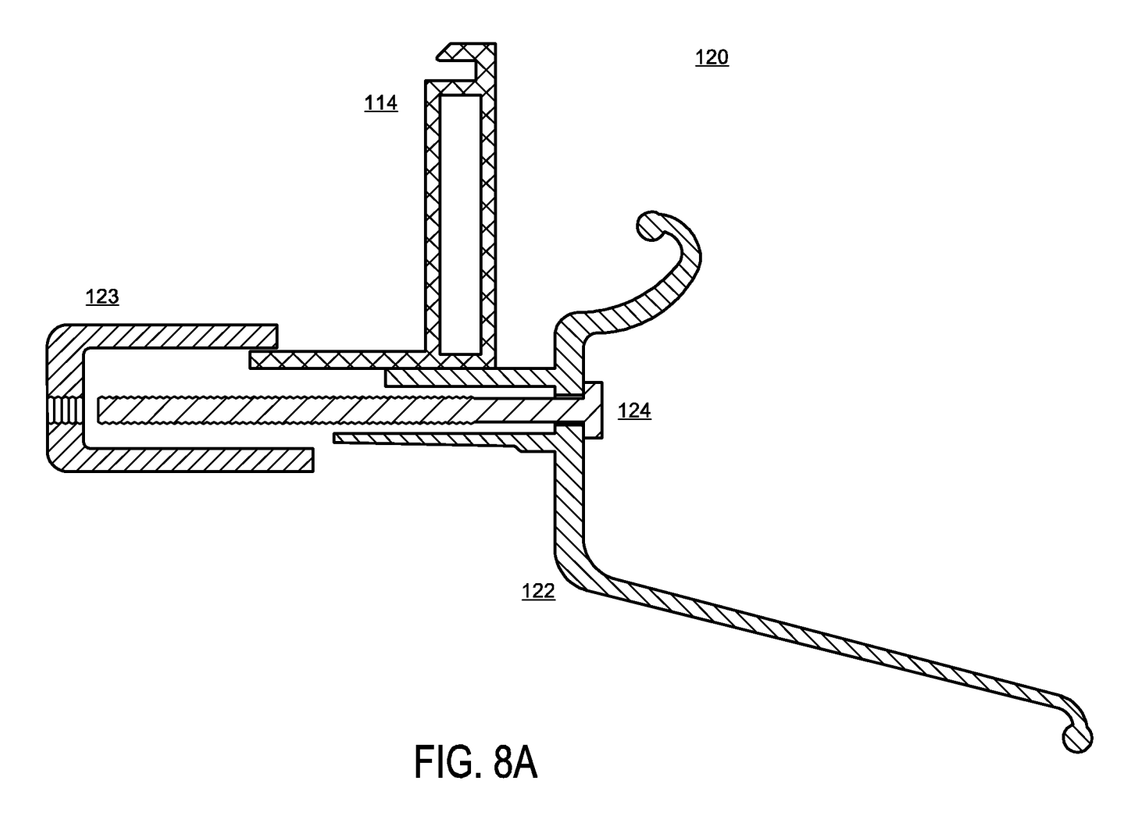
FIGS. 8A-8C show cross-sectional views of the skirt mount assembly, in accordance with various embodiments.
Figure 8B:
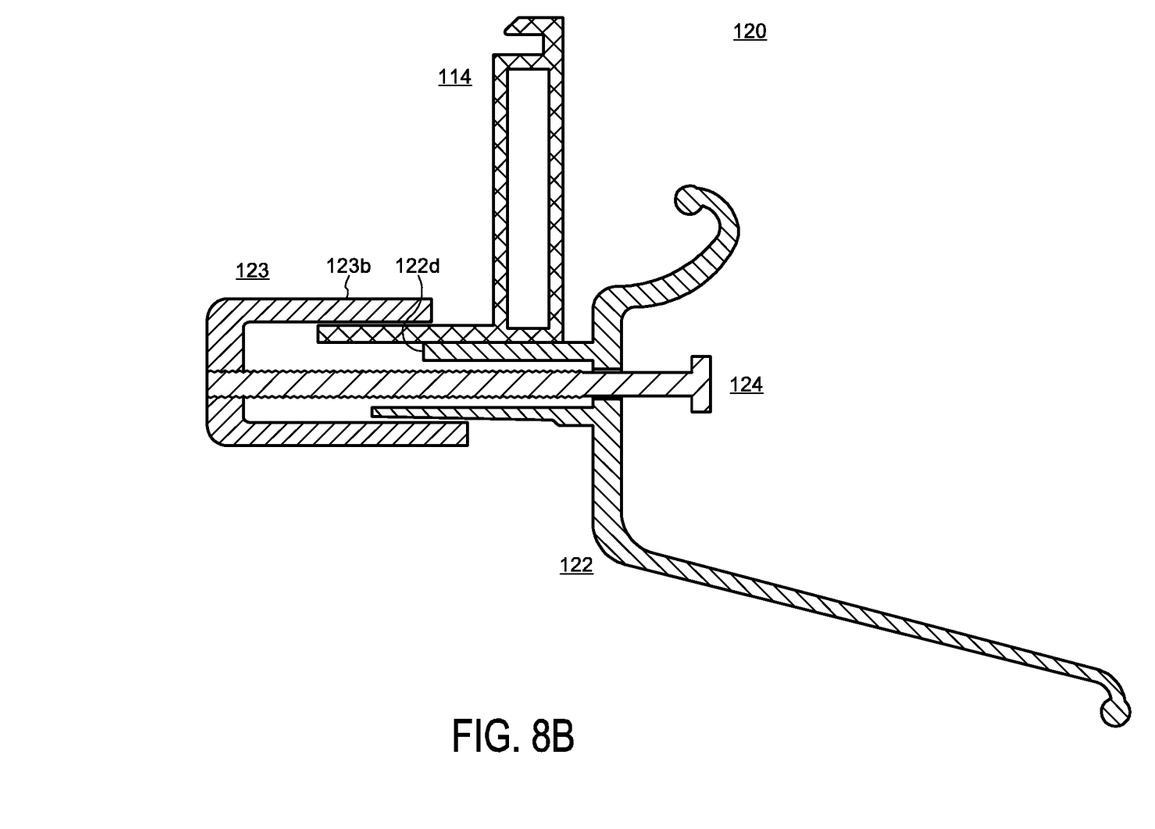
Figure 8C:
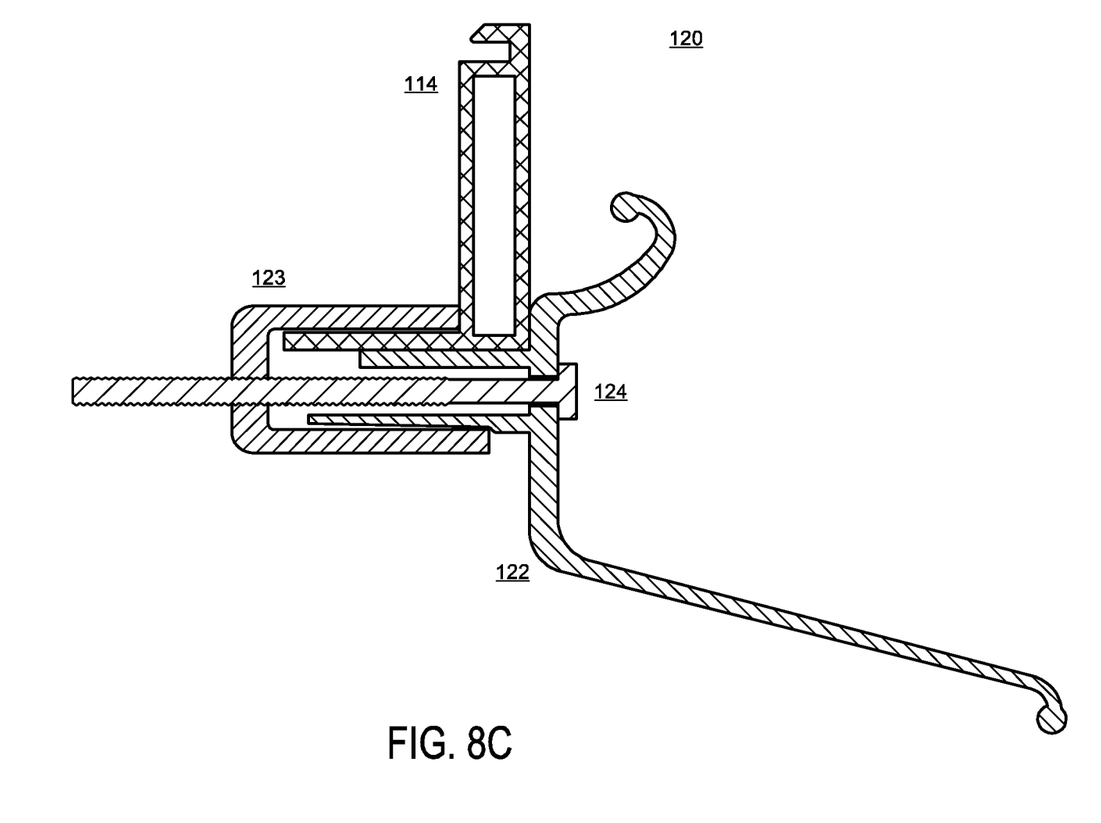

FIGS. 8A-8C show cross-sectional views of skirt mount assembly 120 of being clamped onto module frame 114 in successive stages, in accordance with various embodiments. In FIG. 8A, skirt mount 122 is coupled with the U-shaped member 123 by fastener 124, which will threadably engage aperture 123d. In FIG. 8B, U-shaped member 123 is moved towards skirt mount 122 and arranged so that the horizontal member, which includes horizontal surfaces 114b and 114d, of the module frame 114 is placed in between the guide member 122d and guided member 123b. In FIG. 8C, fastener 124 has been fully tightened to the U-shaped channel, thereby mounting skirt mount assembly 120 to module frame 114.

Figure 9B:
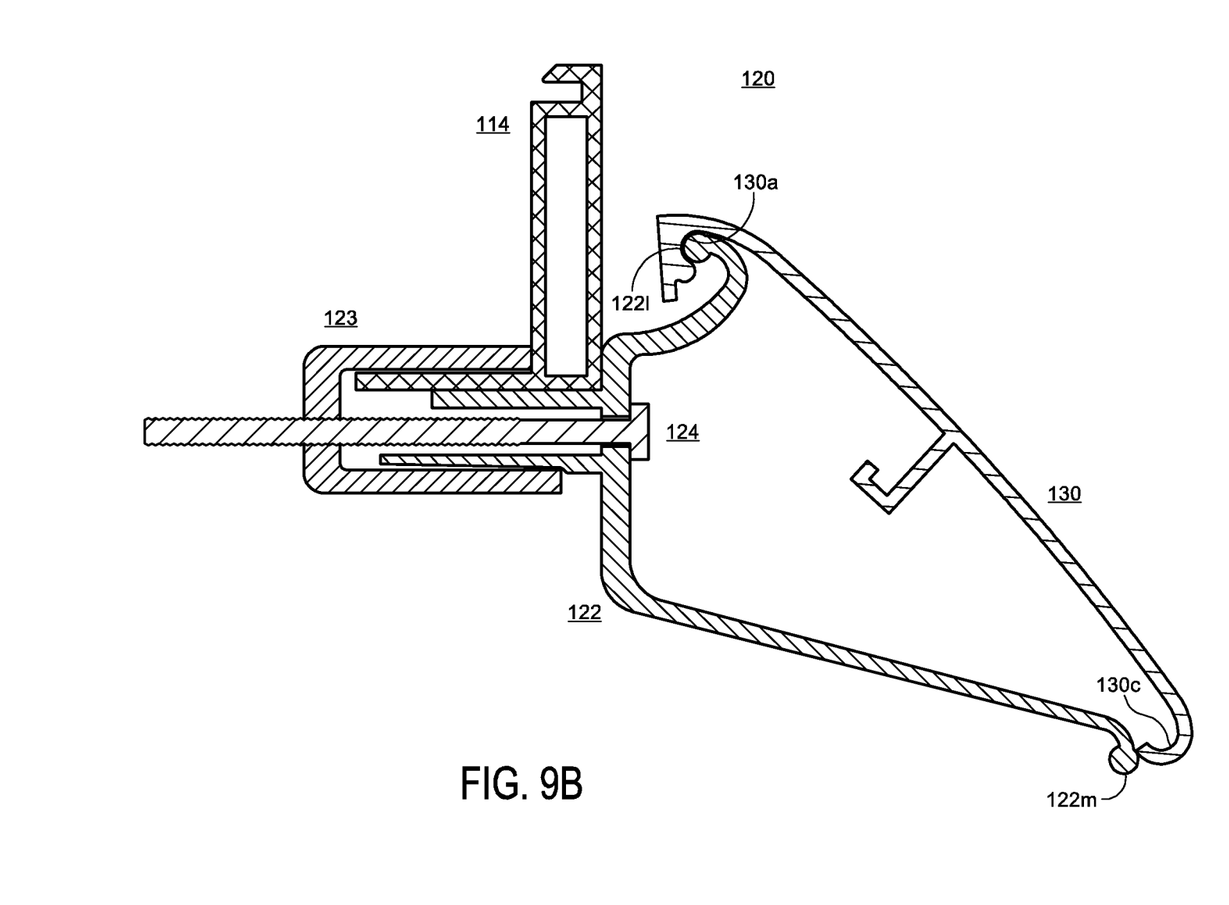
Figure 9C:
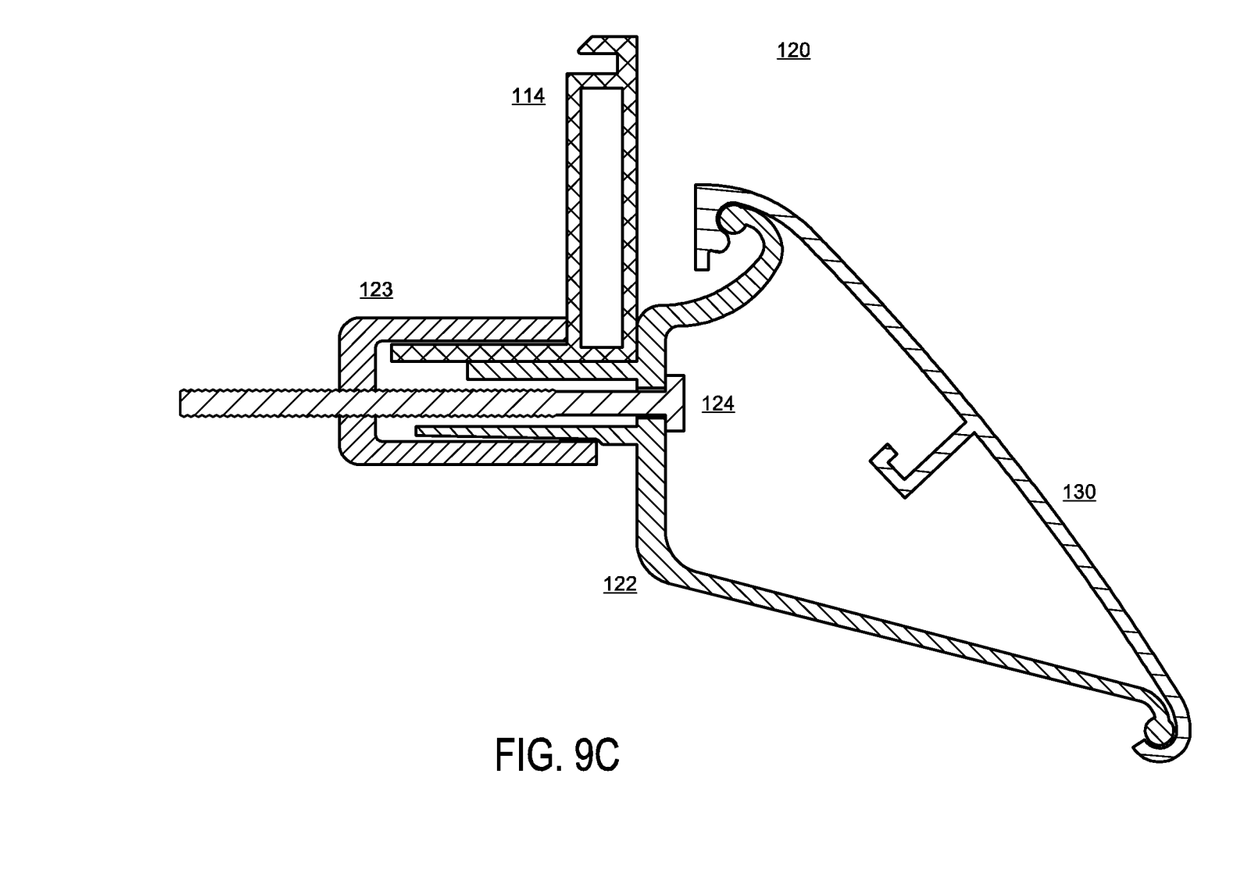

FIGS. 9A-9C show cross-sectional views of the skirt 130 being mounted to the skirt mount assembly 122 in successive stages, in accordance with various embodiments. In FIG. 9A, upper inner surface 130a of curved upper edge 130b of skirt 130 may be placed into a position above tipped end 122l. In FIG. 9B, lower inner surface 130c of curved upper edge 130d will be placed over tipped end 122m. In FIG. 9C, the skirt 130 is shown being attached to the skirt mount 122.

Figure 10:
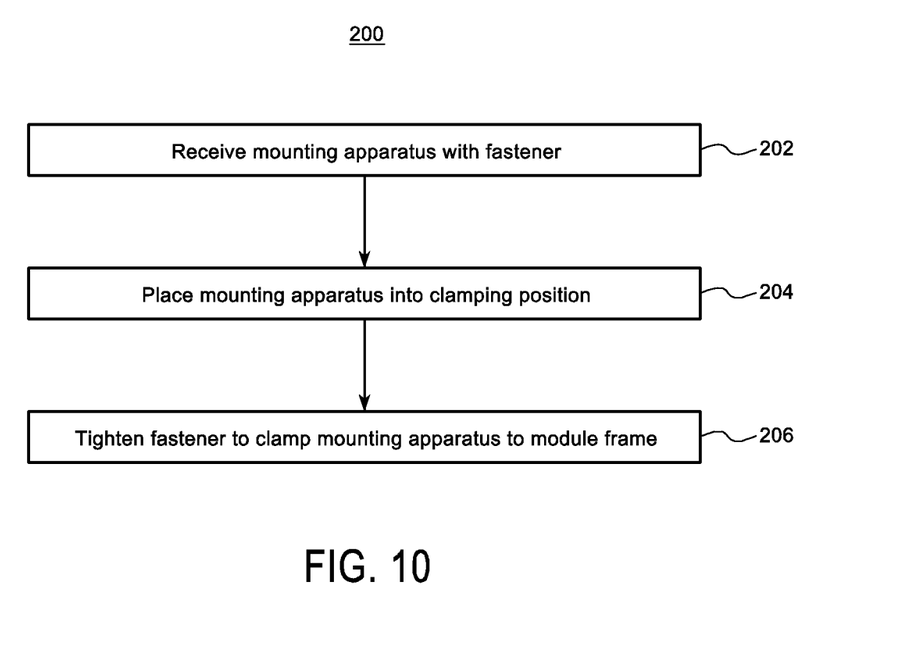
FIG. 10 shows a flowchart of an exemplary process for installing the skirt mount assembly on the module frame, in accordance with various embodiments.

FIG. 10 shows a flowchart of an exemplary process 200 for installing a mounting apparatus of a solar panel system, in accordance with some embodiments. Process 200 can begin at step 202, in which the skirt mount assembly (e.g., skirt mount assembly 120) is received.

At step 204, the skirt mount assembly is placed into a clamping position. One guided member of a u-shaped member (e.g., guided member flange 123b of u-shaped member 123) may be placed in a position above an upper horizontal surface of the module frame (e.g., upper horizontal surface 114d), and a guide member (e.g., guide member 122d) may be placed in a position below a lower horizontal surface of the frame (e.g., lower horizontal surface 114b). Additionally a vertical clamping surface (e.g. vertical clamping surface 122o) may be placed to a side of a vertical surface of the frame (e.g. vertical surface 114a).

At step 206, the skirt mount assembly may be clamped to the module frame by tightening a fastener (e.g. fastener 124) within apertures formed in the skirt mount and the u-shaped members (e.g., apertures 122f and 123d). When tightened, the vertical clamping surface may engage the outer vertical surface, and a stop surface (e.g. stop surface 123h) may engage an inner vertical surface (e.g. inner vertical surface 114c), where these engagements result with the skirt mounting assembly being clamped to the module frame.

In some embodiments, process 200 could include a step in which a skirt (e.g. skirt 130) is attached to the skirt mount assembly. With a plurality of the skirt mounting assemblies being clamped to the module frame(s) 114, an upper inner surface (e.g. upper inner surface 130a) of a curved edge (e.g. curved edge 130b) of the skirt may be placed around a tipped end (e.g. tipped end 122l of the skirt mount assembly), and a lower inner surface (e.g. lower inner surface 130c) of a curved upper edge (e.g. curved upper edge 130d) of the skirt may be placed around a second tipped end of the skirt mount assembly (e.g. tipped end 122m).

It should be understood that the aspects, features and advantages made apparent from the foregoing are efficiently attained and, since certain changes may be made in the disclosed inventive embodiments without departing from the spirit and scope of the invention, it is intended that all matter contained herein shall be interpreted as illustrative and not in a limiting sense.

What is claimed is:

1. A solar panel system, comprising:
    a plurality of solar panel modules, each solar panel module comprising at least one solar panel mounted in a solar panel module frame;
    a plurality of skirt mounting assemblies, each skirt mounting assembly clamped to the solar panel frame and comprising:
        a first structure comprising:
            a first main body having an outer surface and an inner surface opposing the outer surface,
            an upper arm extending from the outer surface to a first circularly-shaped end;
            a lower arm extending from the outer surface to a second circularly-shaped end;
            a first flange extending from the inner surface;
            a second flange extending from the inner surface, wherein at least a portion of a lower surface of the second flange is tapered; and
            a first aperture in the first main body;
        a second structure comprising:
            a second main body;
            a third flange extending from the second main body and towards the outer surface of the first main body; and
            a fourth flange extending from the second main body and towards the outer surface of the first main body;
            a second aperture in the second main body; and
        a fastener extending through the first aperture and into the second aperture; and
    a solar panel module skirt attached to the plurality of skirt mounting assemblies.

2. The solar panel system of claim 1, wherein the first structure and the second structure are configured to clamp to a third structure of the solar panel module frame by placing the third flange and the first flange above and below a horizontal member of the third structure, respectively, and tightening the fastener until a clamping surface of the inner surface engages a first vertical surface of the third structure and a distal end of the third flange engages a second vertical surface of the third structure.

3. The solar panel system of claim 1, wherein the upper arm forms a hook between the outer surface and the first circularly-shaped end.

4. The solar panel system of claim 1, wherein the first and second flanges are on opposite sides of the first aperture, and the third and fourth flanges are on opposite sides of the second aperture.

5. The solar panel system of claim 1, wherein an upper surface of the first flange is located a first distance from the center of the first aperture, and an upper surface of the third flange is located a second distance from the second aperture that is dependent upon the first distance and a thickness of a horizontal member of a third structure.

6. The solar panel system of claim 5, wherein the second distance is substantially the sum of the first distance and the thickness of the horizontal member of the third structure.

7. The solar panel system of claim 1, wherein the first circularly-shaped end and the second circularly-shaped end are configured to engage an upper inner surface and a lower inner surface of the solar panel module skirt, respectively.

8. A method for installing a mounting apparatus of a solar panel system, comprising:
    receiving a mounting apparatus comprising:
        a first structure comprising:
            a first main body having an outer surface and an inner surface opposing the outer surface,
            an upper arm extending from the outer surface to a first circularly-shaped end;
            a lower arm extending from the outer surface to a second circularly-shaped end;
            a first flange extending substantially perpendicular from the inner surface;
            a second flange extending from the inner surface, wherein at least a portion of a lower surface of the second flange is tapered; and
            a first aperture in the first main body;
        a second structure comprising:
            a second main body;
            a third flange extending from the second main body and towards the outer surface of the first main body; and
            a fourth flange extending from the second main body body and towards the outer surface of the first main body;

a second aperture in the second main body; and a fastener extending through the first aperture and into the second aperture;

placing the third flange and the first flange above and below a horizontal member of a third structure, respectively, a clamping surface of the inner surface to a side of a first vertical surface of the third structure, and a distal end of the third flange to a side of a second vertical surface; and tightening the fastener until the inner surface of the clamping surface of the first main body engages the first vertical surface and the distal end of the third flange engages the second vertical surface of the third structure.

9. The method of claim 8, wherein the upper arm forms a hook between the outer surface and the first circularly-shaped end.

10. The method of claim 8, wherein the first and second flanges are on opposite sides of the first aperture, and the third and fourth flanges are on opposite sides of the second aperture.

11. The method of claim 8, wherein an upper surface of the first flange is located a first distance from the center of the first aperture, and an upper surface of the third flange is located a second distance from the second aperture that is dependent upon the first distance and a thickness of a horizontal member of a third structure.

12. The method of claim 11, wherein the second distance is substantially the sum of the first distance and the thickness of the horizontal member of the third structure.

13. The method of claim 8, further comprising: attaching a solar panel module skirt to a plurality of the mounting apparatus by engaging a first inner skirt surface and a second inner skirt surface with the first circularly-shaped end and the second circularly-shaped end, respectively, for each solar panel module skirt.

14. A mounting apparatus of a solar panel system, comprising:

a structure comprising:

a main body having an outer surface and an inner surface opposing the outer surface, an upper arm extending from the outer surface to a first circularly-shaped end;

a lower arm extending from the outer surface to a second circularly-shaped end;

a first flange extending from the inner surface;

a second flange extending from the inner surface, wherein at least a portion of a lower surface of the second flange is tapered; and an aperture in the main body.

15. The mounting apparatus of claim 14, wherein at least one of the upper arm forms a hook between the outer surface and the first circularly-shaped end, the upper arm extends from the outer surface and curves upwardly to form a hook, and the lower arm extends downwardly from the outer surface.

16. The mounting apparatus of claim 14, wherein the structure is a first structure, the main body is a first main body, and the aperture is a first aperture, and the mounting apparatus further comprises:

a second structure comprising:

a second main body;

a third flange extending from the second main body and towards the outer surface of the first main body; and a fourth flange extending from the second main body and towards the outer surface of the first main body;

a second aperture in the second main body; and a fastener extending through the first aperture and into the second aperture.

17. The mounting apparatus of claim 16, wherein the first flange extends substantially perpendicular from the inner surface the first structure, the second flange extends substantially perpendicular from the inner surface, and the second flange extends substantially parallel to the first flange.

18. The mounting apparatus of claim 16, wherein the first structure and the second structure are configured to clamp to a third structure of a solar panel module frame by placing the third flange and the first flange above and below a horizontal member of the third structure, respectively, and tightening the fastener until a clamping surface of the inner surface engages a first vertical surface of the third structure and a distal end of the third flange engages a second vertical surface of the third structure.

19. The mounting apparatus of claim 16, wherein an upper surface of the first flange is located a first distance from the center of the first aperture, and an upper surface of the third flange is located a second distance from the second aperture that is dependent upon the first distance and a thickness of a horizontal member of a third structure.

20. The mounting apparatus of claim 14, wherein the first circularly-shaped end and the second circularly-shaped end are configured to engage an upper inner surface and a lower inner surface of a solar module skirt, respectively.

* * * * *